United States Patent
Rhyu et al.

(10) Patent No.: US 12,132,774 B2
(45) Date of Patent: Oct. 29, 2024

(54) METHOD AND DEVICE FOR CONTROLLING TRANSMISSION AND RECEPTION OF CONTENT IN COMMUNICATION SYSTEM

(71) Applicant: Samsung Electronics Co., Ltd., Suwon-si (KR)

(72) Inventors: Sungryeul Rhyu, Suwon-si (KR); Hakju Lee, Suwon-si (KR); Kyunghun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 17/382,795

(22) Filed: Jul. 22, 2021

(65) Prior Publication Data
US 2022/0030046 A1    Jan. 27, 2022

(30) Foreign Application Priority Data

Jul. 23, 2020 (KR) .................. 10-2020-0091928

(51) Int. Cl.
*G06F 15/16* (2006.01)
*H04L 65/65* (2022.01)
*H04L 65/75* (2022.01)

(52) U.S. Cl.
CPC .............. *H04L 65/75* (2022.05); *H04L 65/65* (2022.05)

(58) Field of Classification Search
CPC ................. H04L 65/75; H04L 65/65
See application file for complete search history.

(56) References Cited

U.S. PATENT DOCUMENTS

2012/0023253 A1* 1/2012 Rhyu ............... H04L 65/61
709/231
2012/0185607 A1* 7/2012 Rhyu ............... H04N 21/6125
709/231
(Continued)

FOREIGN PATENT DOCUMENTS

EP    3 684 068 A1    7/2020
EP    4 102 852 A1    12/2022
(Continued)

OTHER PUBLICATIONS

International Search Report dated Oct. 22, 2021, issued in International Application No. PCT/KR2021/009505.
(Continued)

*Primary Examiner* — Oleg Survillo
(74) *Attorney, Agent, or Firm* — Jefferson IP Law, LLP (57) ABSTRACT

The present disclosure relates to a pre-5th-Generation (5G) or 5G communication system to be provided for supporting higher data rates Beyond 4th-Generation (4G) communication system such as Long Term Evolution (LTE). A method for receiving media content by a client is provided. The method includes receiving, from a server, a media presentation description (MPD) including content type information for three-dimensional (3D) media content and configuration type information for the 3D media content, accessing a segment of the 3D media content based on information included in the MPD, and receiving the 3D media content based on the segment. The content type information may indicate an identifier for the 3D media content, and the configuration type information may indicate whether quality is adjustable for each of content components of the 3D media content.

16 Claims, 4 Drawing Sheets

(56) References Cited

U.S. PATENT DOCUMENTS

| | | | |
|---|---|---|---|
| 2014/0101118 A1* | 4/2014 | Dhanapal | H04L 65/765 707/E17.005 |
| 2016/0088054 A1 | 3/2016 | Hassan et al. | |
| 2016/0149978 A1* | 5/2016 | Wissingh | H04L 65/61 709/231 |
| 2016/0182594 A1* | 6/2016 | White | H04L 65/61 709/219 |
| 2016/0182941 A1* | 6/2016 | Crabtree | H04N 21/8456 725/115 |
| 2017/0126769 A1 | 5/2017 | Rhyu et al. | |
| 2017/0142183 A1* | 5/2017 | Maze | H04N 21/85406 |
| 2017/0223083 A1* | 8/2017 | Maze | H04L 65/65 |
| 2019/0014350 A1 | 1/2019 | Wang | |
| 2019/0158933 A1* | 5/2019 | Ouedraogo | H04N 21/21805 |
| 2019/0200096 A1* | 6/2019 | Katsumata | H04N 21/8456 |
| 2020/0045384 A1* | 2/2020 | Nilsson | H04N 21/84 |
| 2020/0053435 A1* | 2/2020 | Denoual | H04N 21/8456 |
| 2021/0006871 A1* | 1/2021 | Sodagar | H04N 21/858 |
| 2022/0053224 A1* | 2/2022 | Katsumata | G06T 15/00 |
| 2022/0095001 A1* | 3/2022 | Harviainen | H04N 21/85406 |
| 2022/0150552 A1* | 5/2022 | Yamagishi | H04L 65/70 |
| 2022/0159316 A1* | 5/2022 | Katsumata | H04N 21/4728 |
| 2022/0191586 A1* | 6/2022 | Toullec | H04N 21/4331 |
| 2023/0132473 A1* | 5/2023 | Lee | H04N 13/366 382/154 |

FOREIGN PATENT DOCUMENTS

| | | |
|---|---|---|
| KR | 10-2012-0083744 A | 7/2012 |
| KR | 10-2017-0032431 A | 3/2017 |
| KR | 10-2020-0024829 A | 3/2020 |
| WO | 2020/116154 A1 | 6/2020 |
| WO | 2020/141258 A1 | 7/2020 |

OTHER PUBLICATIONS

3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16), 3GPP TS 26.247 V16.4.1, Oct. 1, 2020.

Schulzrinne, et al., Real Time Streaming Protocol (RTSP), Network Working Group, Request for Comments: 2326, Category: Standards Track, Apr. 1, 1998.

3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 13), 3GPP TS 26.247 V13.1.0, Sep. 2015.

Extended European Search Report dated Aug. 9, 2023, issued in European Patent Application No. 21846247.1.

* cited by examiner

METHOD AND DEVICE FOR CONTROLLING TRANSMISSION AND RECEPTION OF CONTENT IN COMMUNICATION SYSTEM

CROSS-REFERENCE TO RELATED APPLICATION(S)

This application is based on and claims priority under 35 U.S.C. § 119(a) of a Korean patent application number 10-2020-0091928, filed on Jul. 23, 2020, in the Korean Intellectual Property Office, the disclosure of which is incorporated by reference herein in its entirety.

BACKGROUND

1. Field

The disclosure relates to an adaptive streaming technology for three-dimensional (3D) media in a communication system. More particularly, the disclosure relates to a device and method for efficiently transmitting and receiving three-dimensional (3D) media having different attributes and structures from 2D media in a communication system.

2. Description of Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A media streaming service of the related art provides content (e.g., a movie) representing the service and content components (e.g., video, audio, and subtitle) constituting the content. The media streaming service may also provide a bitstream encoded with a plurality of different parameters and a manifest file providing main attribute information about the bitstream.

The manifest file provides parameters necessary to receive the bit stream and a uniform resource locator (URL) for receiving the parameters, and the parameters may be parameters used for encoding or parameters describing the attributes of content components before and after encoding.

The media streaming service may be provided to a terminal so that the terminal may adaptively select and receive suitable content or all (or some) of content depending on the performance of the terminal or real-time context of the network.

Examples of such a media streaming service include motion pictures expert group dynamic adaptive streaming over hypertext transfer protocol (HTTP) (MPEG-DASH) (ISO/IEC 23009-1), $3^{rd}$ generation partnership project (3GPP)-DASH (TS 26.247), and real time streaming protocol (RTSP) (RFC 2326).

However, media streaming services of the related art assume transmission of two-dimensional (2D) media. Thus, a new communication scheme between a content provider server and a receiving terminal is needed to transmit such media as three-dimensional (3D) media which have different structures and attributes from 2D media.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method for efficiently transmitting and receiving three-dimensional (3D) media having different attributes and structures from 2D media in a communication system.

Additional aspects will be set forth in part in the description which follows and, in part, will be apparent from the description, or may be learned by practice of the presented embodiments.

In accordance with an aspect of the disclosure, a method for receiving media content by a client is provided. The method includes receiving, from a server, a media presentation description (MPD) including content type information for 3D media content and configuration type information for the 3D media content, accessing a segment of the 3D media content based on information included in the MPD, and receiving the 3D media content based on the segment.

According to an embodiment of the disclosure, the content type information may indicate an identifier for the 3D media content, and the configuration type information may indicate either a one-multiplexed content component (OMCC) in which content is composed of one content component or a separately adaptable content component (SACC) in which quality may be adjusted for each content component.

According to an embodiment of the disclosure, the content type information may be included, as an attribute, in a subset element or a preselection element which is a media content unit included in the MPD.

According to an embodiment of the disclosure, the configuration type information may be included, as an attribute, in the subset element or the preselection element which is the media content unit included in the MPD.

According to an embodiment of the disclosure, when the configuration type information indicates the SACC, the MPD may further include role information for each of a plurality of content components, and the role information may be included, as an attribute, in an AdaptationSet element which is a content component unit.

According to an embodiment of the disclosure, the MPD may further include quality priority information for at least one content component. The quality priority information may be included, as an attribute, in a subset element or a preselection element which is a media content unit included in the MPD or may be included, as an attribute, in an AdaptationSet element which is a content component unit included in the MPD.

According to an embodiment of the disclosure, the MPD may further include resolution information for at least one content component. The resolution information may include information necessary to convert the 3D media content into two-dimensional (2D) media and may be included, as an attribute, in an AdaptationSet element which is a content component unit included in the MPD.

According to an embodiment of the disclosure, the MPD may further include quality evaluation information for final 3D media corresponding to a combination of content components. The quality evaluation information may be included, as an attribute, in a subset element or a preselection element which is a media content unit included in the MPD.

In accordance with another aspect of the disclosure, a method for providing media content by a server is provided. The method includes transmitting, to a client, a media presentation description (MPD) including content type information for 3D media content and configuration type information for the 3D media content, receiving a request for a segment of the 3D media content from the client, and transmitting the 3D media content to the client.

In accordance with another aspect of the disclosure, a client terminal configured to receive media content is provided. The client terminal includes a transceiver and at least one processor configured to control to receive, from a server, a MPD including content type information for 3D media content and configuration type information for the 3D media content, access a segment of the 3D media content based on information included in the MPD, and receive the 3D media content based on the segment.

In accordance with another aspect of the disclosure, a server configured to provide media content is provided. The server includes a transceiver and at least one processor configured to control to transmit, to a client, a MPD including content type information for 3D media content and configuration type information for the 3D media content, receive a request for a segment of the 3D media content from the client, and transmit the 3D media content to the client.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the disclosure may also be applicable to communication systems with a similar technical background with minor changes without significantly departing from the scope of the disclosure, and this may be possible under the determination of those skilled in the art to which the disclosure pertains. As used herein, the term "communication system" encompasses broadcast systems, but when a broadcast service is a main service, the communication system may be clearly mentioned as broadcast system.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

Methods described below in connection with embodiments are based on hardware. However, embodiments of the disclosure encompass technology using both hardware and software and thus do not exclude software-based methods.

As used herein, the terms denoting signals, files, network entities, service provider or media content provider device, and components of media processing terminals are provided as an example for convenience of description. The disclosure is not limited to the terms, and other terms equivalent in technical concept may also be used.

According to an embodiment of the disclosure, there are proposed methods for identifying, providing relational/spatial configuration information for, specifying roles for, considering priority for, and providing post-reception expected quality for three-dimensional (3D) media having a different structure or different role from two-dimensional (2D) media according to the related art.

According to an embodiment of the disclosure, a service provider, a content provider, and a (media reception) terminal may adaptively process 3D media (e.g., provide, transmit, or play 3D media).

According to an embodiment of the disclosure, 3D media may be configured of 2D media combinations. According to an embodiment of the disclosure, a terminal may receive and play 2D media using a 3D player proposed according to the disclosure, not a 2D player of the related art, although a configuration of the 3D media provided from a service provider (or content provider) is 2D media.

According to an embodiment of the disclosure, the 3D media may be provided in a different format from 2D media, with all 2D media combinations multiplexed with one content component, or may be provided, with each 2D media mapped to a content component.

According to an embodiment of the disclosure, a service provider, a content provider, and a terminal may exchange at least one of provision format information for 3D media and 3D media configuration information between each other. The service provider, content provider, and terminal may exchange information for transmission/reception for each component of 3D media adaptively depending on network context and may exchange information necessary for post-processing (e.g., scaling) and using the adaptively transmitted/received components.

According to an embodiment of the disclosure, the service provider, content provider, and terminal may exchange information for inferring the final quality of 3D media determined for each quality/combination of components of 3D media upon transmission/reception for each component of 3D media adaptively depending on network context, and the terminal may receive (or process) a combination for ensuring a minimum quality for critical items depending on the determination by a 3D application and a 3D player.

Figure 1:
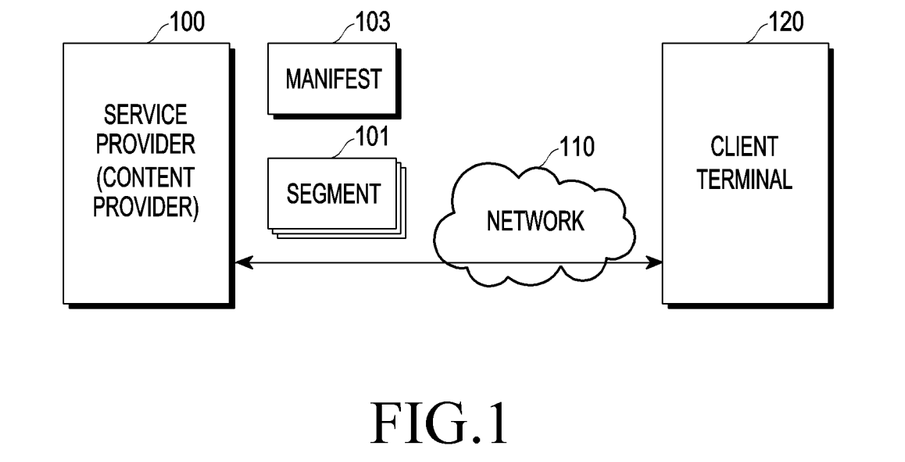
FIG. 1 is a view illustrating a communication system according to an embodiment of the disclosure.

FIG. 1 is a view illustrating a communication system according to an embodiment of the disclosure.

Referring to FIG. 1, a communication system 10 may include a service provider or content provider 100, a network 110, and a client terminal 120.

The service provider or content provider 100 may adaptively provide a service related to media content to the client terminal 120 depending on network context and terminal capability.

According to an embodiment of the disclosure, the service provider or content provider 100 may be implemented as a server or may be referred to as a server.

The media content may be 3D augmented reality (AR), mixed reality (MR), extended reality (XR), or virtual reality (VR) media. The media content may include some 2D media in 3D media or may be composed of 2D media combinations.

There may be provided 3D or 2D media segments 101 and manifest information 103 for providing the 2D media segments 101 for the service provider or content provider 100 to provide a media content service. The 3D or 2D media segment may be composed of content and content components constituting the content.

The network 110 may relay between the service provider or content provider 100 and the client terminal 120 so that the service provider or content provider 100 may provide media content to the client terminal 120.

The client terminal 120 may adaptively receive and play the media content provided by the service provider or content provider 100. The client terminal 120 may also be referred to as a client or a terminal.

Figure 2:
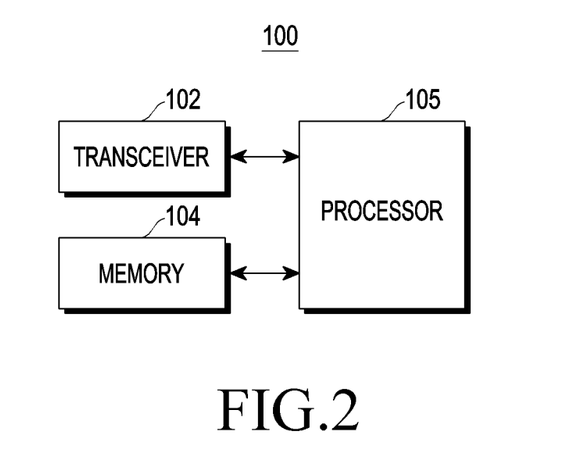
FIG. 2 is a block diagram illustrating a service provider (or content provider) according to an embodiment of the disclosure.

FIG. 2 is a block diagram illustrating a service provider (or content provider) according to an embodiment of the disclosure.

Referring to FIG. 2, the service provider or content provider 100 may include a transceiver 102, a memory 104, and a controller 105. The transceiver 102, the memory 104, and the controller 105 may operate according to a communication method for the service provider or content provider 100, which is described below.

However, the components of the service provider or content provider 100 are not limited to the above-described examples. For example, the service provider or content provider 100 may include more or fewer components than the aforementioned components. The transceiver 102, the memory 104 and the controller 105 may be implemented in the form of a single chip. The controller 105 may include one or more processors.

The transceiver 102 collectively refers to a transmitter and a receiver and may transmit and receive signals to/from the client terminal. The signals may include control information and content-related data. To that end, the transceiver 102 may include a radio frequency (RF) transmitter for frequency-up converting and amplifying signals transmitted and an RF receiver for low-noise amplifying signals received and frequency-down converting the frequency of the received signals. However, this is merely an example of the transceiver 102, and the components of the transceiver 102 are not limited to the RF transmitter and the RF receiver.

The memory 104 may store a program and data necessary for the operation of the service provider or content provider 100. The memory 104 may store the control information or content-related data included in a signal obtained by the service provider or content provider 100. The memory 104 may include a storage medium, such as read only memory (ROM), random access memory (RAM), hard disk, compact disc (CD)-ROM, and digital versatile disc (DVD), or a combination of storage media. Rather than being separately provided, the memory 104 may be embedded in the controller 105.

The controller 105 may control a series of processes to operate the service provider or content provider 100 according to embodiments described below. For example, the controller 105 may receive a control signal and a data signal through the transceiver 102 and process the received control signal and data signal. The controller 105 may transmit the processed control signal and data signal through the transceiver 102. There may be provided a plurality of controllers 105. The controller 105 may control the components of the service provider or content provider 100 by executing a program stored in the memory 104.

The controller 105 may control to transmit, to the client, a media presentation description (MPD) including content type information for 3D media content and configuration type information for the 3D media content, control to receive, from the client, a request for a segment of the 3D media content, and control to transmit the 3D media content to the client.

The content type information may indicate an identifier for 3D media, and the configuration type information may indicate one of a one-multiplexed content component (OMCC) in which content is composed of one content component and a separately adaptable content component (SACC) in which quality may be adjusted for each content component.

Figure 3:
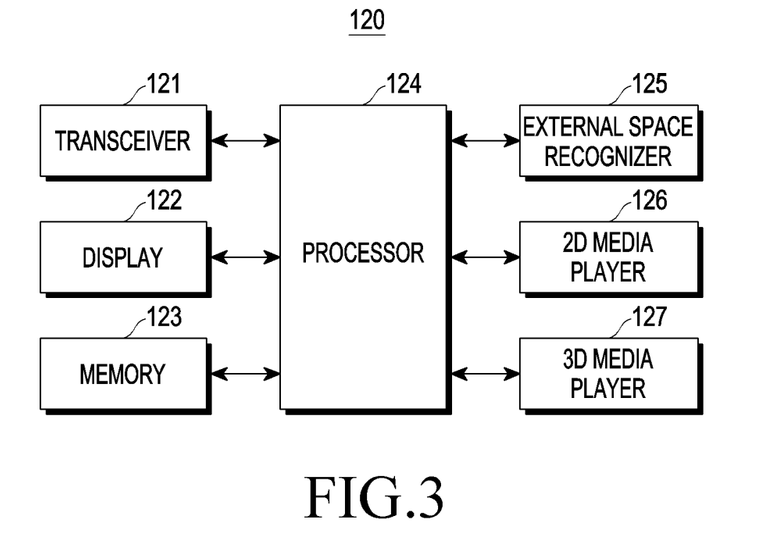
FIG. 3 is a block diagram illustrating a client terminal according to an embodiment of the disclosure.

FIG. 3 is a block diagram illustrating a client terminal according to an embodiment of the disclosure.

Referring to FIG. 3, a client terminal 120 may include a transceiver 121, a display 122, a memory 123, a processor or controller 124, an external space recognizer 125, a 2D media player 126, and a 3D media player 127. The transceiver 121, the display 122, the memory 123, the controller 124, the external space recognizer 125, the 2D media player 126, and the 3D media player 127 may be operated according to a communication method of the client terminal 120 described below.

However, the components of the client terminal 120 are not limited thereto. For example, the client terminal 120 may include more or fewer components than the above-described components.

According to an implementation, the client terminal 120 may include a plurality of same components 121 to 127 thereinside or thereoutside.

The client terminal 120 may select and receive all (or some) of appropriate content components depending on network context or terminal capability.

The transceiver 121 collectively refers to a transmitter and a receiver and may transmit and receive signals to/from the service provider, content provider, or server. The signals may include control information, content request information, and content. To that end, the transceiver 121 may include a radio frequency (RF) transmitter for frequency-up converting and amplifying signals transmitted and an RF receiver for low-noise amplifying signals received and frequency-down converting the frequency of the received signals. However, this is merely an example of the transceiver 121, and the components of the transceiver 121 are not limited to the RF transmitter and the RF receiver.

The display 122 may play and display the media content received by the client terminal 120 from the service provider or content provider 100.

The memory 123 may store a program and data necessary to operate the client terminal 120. The memory 123 may store the control information or content-related data included in the signal obtained by the client terminal 120. The memory 123 may include a storage medium, such as ROM, RAM, hard disk, CD-ROM, and DVD, or a combination of storage media. Rather than being separately provided, the memory 123 may be embedded in the controller 124.

The controller 124 may control a series of processes to operate the client terminal 120 according to various embodiments described below. For example, the controller 124 may receive a control signal and a data signal through the transceiver 121 and process the received control signal and data signal. The controller 124 may transmit the processed control signal and data signal through the transceiver 121. There may be provided a plurality of controllers 124. The controller 124 may control the components of the client terminal 120 by executing a program stored in the memory 123.

The client terminal 120 may display the received media content on a virtual space and match the virtual space to a space recognized by the external space recognizer 121, thereby providing the user of the client terminal 120 with such an effect as if the media content is displayed on an actual external space.

The 2D media player 126 may control to allow the 2D media content provided from the service provider or content provider 100 to be played on the client terminal 120.

The 3D media player 127 may control to allow the 3D media content provided from the service provider or content provider 100 to be played on the client terminal 120.

DASH stands for dynamic adaptive streaming over HTTP. DASH may divide contents and representations obtained by encoding the same content components constituting the same contents under different conditions (e.g., network bandwidth, resolution, or codec) into segments of a sufficiently short time (e.g., 1 second to 10 seconds) and then provide a multimedia presentation description (serving as a manifest file) that specifies the file name, sequence number, start time, and length of each segment.

The segments consist of an initialization segment that has information for a decoder configuration to properly decode a corresponding representation and media segments including segmented content components.

The terminal requests an MPD, receives the MPD from the service provider (or content provider), identifies what representations are provided, and then determines, e.g., the performance or capability of the client terminal, and network speed, and select an appropriate representation and sequentially download and play fragments.

If variables, e.g., network bandwidth, are changed, e.g., if the network speed increases, fragments of a representation created with a higher bandwidth may be selected and played and may thus be seamlessly played although image quality is varied depending on the network speed.

By the user's or client terminal's selection, a change of an available language and media segment combination may be selected from the attribute information for an available adaptive combination group (adaptationSet) and playback may be performed.

The real-time streaming protocol (RTSP) is a protocol standardized by the Internet engineering task force (IETF) for real-time transmission/reception of multimedia data, such as video/audio data. This is a protocol to remotely control the server providing media data to transmit and receive streaming data and is a protocol to remotely perform control operations, such as "PLAY" and "PAUSE."

According to the disclosure, there are proposed schemes for configuring 1) a 3D media identifier, 2) 3D content configuration type, and 3) 3D media configuration information as schemes for efficiently transmitting and receiving 3D media with different attributes and structures from 2D media in a communication system.

3D Media Identifier

According to the disclosure, there is proposed a method for a terminal to identify whether media provided from a service provider is 3D media or 2D media according to the related art.

The technology of the related art, such as DASH, requires no separate information indicating whether media are 2D media because all image media are 2D media.

In the technology of the related art, a manifest provides the type of content component (e.g., whether the content component is a video or audio) or compression information (e.g., what video encoder has been used for encoding, e.g., high efficiency video coding (HEVC)).

Thus, a terminal adopting the technology of the related art is previously aware that video and audio content components are needed to constitute content although there is no separate indication as to the structure of content for 2D media, and the terminal may select an adaptive transmission group [adaptationSet] provided for each content component, and receive file fragments for the stored representation by the encoder supported therein. As used herein, the term "representation" refers to a format in which content is represented, and there may be high-image quality representations and high-image quality representations.

According to the disclosure, there is provided a method for transmitting and receiving new media by configuring in a composite manner by using content and content components for 2D media of the related art for different purposes and allowing a specific player to provide a new multimedia experience.

In other words, there is proposed a method for identifying that content is new media that may not be processed (or consumed) by 2D media players of the related art, e.g., an ISO/IEC23090-5 video-based point cloud compression (VPCC) or mesh media (here, the VPCC media may consist of three or more 2D video content components to perform different roles by decomposing 3D media and metadata related to the three or more 2D video content components. the mesh media may consist of surface color information and metadata of points, lines, and surfaces by decomposing 3D media), allowing an appropriate player (e.g., a 3D media player) to process the media, and supporting content components to the 3D media player partially using the 2D media player.

According to the disclosure, there is proposed a method for explicitly specifying an identifier for the type of media on a per-content or per-content component basis, by the manifest, so as to identify whether media provided is 3D media or 2D media. In a terminal according to the disclosure, a player capable of playing the media is associated with the playback of media according to the specified media identifier.

When one manifest includes a plurality of adaptation sets (AdaptationSet), each adaptation set may correspond to a content component in the concept of the disclosure. Further, a subset or presentation for specifying the adaptation sets, which are played together, in bundle may correspond to content.

@contentType exists as an attribute of the AdaptationSet. @contentType is specified as meaning a format identifier of the content component provided by the AdaptationSet (23009-1 4th edition, Ch.5.3.3).

Therefore, issues to be addressed according to the disclosure, e.g., processing (or consumption), by a 2D player, of 3D content composed 2D content components, may not be resolved simply by specifying the type on a per-content component basis.

According to the disclosure, since the media type identifier is specified in units of contents or content components as described above, it is proposed to add @contentType, as an attribute, to the content units of the related art, i.e., subsets or preselection elements.

According to the disclosure, an appropriate player is selected depending on @contentType, the playback of elements including @contentType is performed according to a playback process of the player, and it is thus prevented that an inappropriate player plays content or content components.

Thus, according to an embodiment of the disclosure, a terminal may first inspect the presence or absence of a subset or preselection in the received manifest and, if there are one or more subsets or presentations, search for the @contentType, and perform comparison as to whether the @contentType value matches at least one in a list of identifiers supported by the player equipped in the terminal.

If the @contentType value matches at least one in the list of identifiers supported by the player equipped in the terminal, the terminal may activate the player, transfer the subsets or preselections, and receive one subset or preselection selected by the player or the user operating the player.

According to another embodiment of the disclosure, the terminal may inspect the presence or absence of a subset or preselection in the received manifest and, if no subset or preselection is in the received manifest, search for the @contentType in the AdaptationSet, perform comparison as to whether the @contentType value in the AdaptationSet matches at least one in a list of identifiers supported by the player equipped in the terminal, and if the @contentType value in the AdaptationSet matches at least one in the identifier list, activate the player and transfer the AdaptationSet.

Table 1 shows an example of a subset including a contentType, and Table 2 shows an example of a preselection including a contentType.

TABLE 1

<MPD>
...
<Subset id="1" contains="1 2" contentType="VPCC/MP4" />
<AdaptationSet Id="1" />
<AdaptationSet Id="2" />
<AdaptationSet Id="3" />
...

TABLE 2

<MPD>
...
<Preselection id="1" preselectionComponents="1 2" contentType="VPCC/MP4"
/>
<AdaptationSet Id="1" />
<AdaptationSet Id="2" />
<AdaptationSet Id="3" />
...

When the identifier describing the provided content or content components is not a format identifiable by the terminal although the terminal is able to play 3D media, the terminal may search manifest information for playable content or content components with another identifier.

When the identifier describing the provided content or content components is not a format identifiable by the terminal although the terminal is able to play 3D media, the terminal may play 2D media, receive a program/plug-in/library for supplementing the player of the terminal based on the identifier information and play, or may search an alternative manifest provided from the server for playable content or content components with another identifier.

In the search step, a method for providing the alternative manifest is as follows.

The content provider may represent a plurality of base URLs, thereby providing a list of URLs, which are based on a content delivery network (CDN) having a plurality of different geolocations to allow an adaptive content receiver to receive content most quickly. In the related art, however, there is no reason to express what different attribute each link has in the base URL list since it is assumed that the same content is transmitted as the manifest file received according to the base URL.

According to an embodiment of the disclosure, a content provider and a terminal having an adaptive content receiver include one or more 3D media identifiers described in the manifest file received using the base URL as the attribute of base URL. Thus, the adaptive content receiver identifies the identifier of playable 3D media by communicating with a content player and receives the base URL providing the identifier.

Table 3 shows examples of base URLs according to the related art, and Table 4 shows an example of a method for providing an MPD including other types of 3D media.

TABLE 3

```
<MPD>
    <BaseURL>http://cdn1.example.com/</BaseURL>
    <BaseURL>http://cdn2.example.com/</BaseURL>
```

TABLE 4

```
<MPD>
    <BaseURL 3dMediaType="type1, type2">http://site.example.com/12/</BaseURL>
    <BaseURL 3dMediaType="type3, type4">http://site.example.com/34/</BaseURL>
```

Configuration Type of 3D Content

The VPCC may decompose 3D media and compose three or more 2D video content components playing different roles and related metadata, and the mesh may decompose 3D media and compose surface color information and metadata of points, lines, and surfaces.

In new media providing a new multimedia experience, such as the VPCC or the mesh, one content is composed of one or more content components, and the plurality of content components are multiplexed and may resultantly be identified as a new format.

For example, the VPCC may be composed of three or more 2D video content components, which plays different roles, and related metadata, i.e., four or more content components in total, and may include one content component that is one visual volumetric video-based coding (V3C) bitstream in which all of the components have been multiplexed.

For example, mesh media may be composed of a metadata content component having information for points, lines, and surfaces, and a texture image content component corresponding to the color of the surface and may have only one multiplexed bitstream, in which the content components are compressed and combined, as a content component.

It is obvious that for adaptive transmission when content is composed of only one multiplexed bitstream content component, image quality adjustment options for several conditions are individually applied to all of the pre-multiplexing content components, and a target bitrate of the multiplexed bitstream is finally formed. This is referred to herein as a one multiplexed content component (OMCC) configuration.

However, when configuration information for content is provided to be identified in units of content components, a target bitrate may be provided per content component for adaptive transmission. This is referred to herein as a SACC configuration.

The OMCC configuration has an advantage in that a target bitrate may be selected to meet the bandwidth depending on network context and content may adaptively be received. In other words, upon receiving one content component having, as an attribute, a target bitrate lower than the available bandwidth, all the content components belonging to the content may be encoded and multiplexed in interoperable quality. Further, since all the content components are temporally synchronized in the reception segment, there is no separate information for synchronization (or sync).

The SACC configuration advantageously adjusts the reception quality per content component depending on more flexible application use cases and resultantly adjust content quality. For example, when a building is represented as a 3D object and the 3D object is transmitted, the 3D object may be displayed at a sufficient level although the color information is relatively lowered while the geometric details of the object are maintained. In the case of clothing which has complicated patterns in product information for online shopping, the clothing patterns may be displayed at a high image quality while the geometric details are simplified.

According to an embodiment of the disclosure, upon displaying a list of contents in a manifest, the OMCC or SACC may be separately displayed according to the content component configuration method, in addition to identifier information for the type of appropriate player and media.

In other words, in a method for providing content information supporting both the OMCC and SACC, the manifest may include content information, the content information may have at least two items of content, and in the configuration method attributes for the items, one may be indicated as OMCC, and the other as SACC. In this case, at the time of receiving and playing media, the terminal may select one multiplexed component or select one from among several components which may be selected for quality and received depending on application use cases.

Table 5 below shows an example of separately indicating the OMCC or SACC in the subset of the manifest.

TABLE 5

```
<MPD>
    ...
    <Subset id="1" contains="1" contentType="VPCC/MP4" compostionType="OMCC"
    />
    <Subset id="2" contains="2 3 4 5" contentType="VPCC/MP4" compostionType=
"SACC" />
        <AdaptationSet Id="1" />
        <AdaptationSet Id="2" />
        <AdaptationSet Id="3" />
        ...
```

Configuration Information for 3D Media

According to the disclosure, there is provided a method for identifying the type of each content component for a terminal to receive content representing 3D media and content components of the content, according to the usage of an application, in the SACC configuration in which a target bitrate may be provided per content component.

According to the disclosure, there is proposed a method for specifying each role at the content component level. In the VPCC, there are largely four types of content components, i.e., geometry, attribute, occupancy, and atlas. Thus, it is possible to specify that the content is of the VPCC and the content component is of one of the four types.

Specifically, a geometry and an attribute may include one content component and two content components, respectively, and one geometry may be represented with one layer, and one geometry may be represented with two layers. In this case, two layers may be included in one content component, or each of the two layers may be included in one of two content components.

Thus, since there may be various combinations of roles that one content component has, it is allowed to define a role scheme and use a combination of one or more of values defined by the scheme.

@schemeldUri is used to identify the role scheme used to identify the role of the content component, and one adaptation set or one content component may be assigned to a plurality of roles within the same scheme.

Table 6 shows an example of the scheme, and Table 7 shows an example of the role.

TABLE 6

| Role @value | Description |
| --- | --- |
| VPCC | MPEG-VPCC compliant content |
| SACC | Separately Adaptible Content Component |
| OMCC | One Multiplexed Content Component |
| Geometry | VPCC geometry video stream |
| Attribute | VPCC attribute video stream |
| Occupancy | VPCC occupancy map video stream |
| Atlas | VPCC atlas data stream |
| numLayer=1..n | 1..n layer coding |
| Layer0..(n-1) | 0..(n-1)th layer |
| Rate=1..n | Compressions rate n. implicitly means lossy coding |
| hasEomPatch | Enhanced Occupancy Map included |
| Lossless | Lossless coding |

TABLE 7

```
<MPD>
...
  <Subset id="1" contains="1 2 3 4 5" contentType="VPCC/MP4" compositionType="SACC">
    <Role schemeIDUrl="urn:mpeg:vpcc:2020" value="sacc"/>
  </Subset>
  <AdaptationSet Id="1">
    <Role schemeIdUrl="urn:mpeg:vpcc:2020" value="geometry numLayer=2 layer0"/>
  </AdaptationSet>
  <AdaptationSet Id="2"></AdaptationSet>
    <Role schemeIdUrl="urn:mpeg:vpcc:2020" value="geometry numLayer=2 layer1"/>
  <AdaptationSet Id="3">
    <Role schemeIdUrl="urn:mpeg:vpcc:2020" value="attribute numLayer=1"/>
  </AdaptationSet>
  <AdaptationSet Id="4">
    <Role schemeIdUrl="urn:mpeg:vpcc:2020" value="occupancy numLayer=1"/>
  </AdaptationSet>
  <AdaptationSet Id="5">
    <Role schemeIdUrl="urn:mpeg:vpcc:2020" value="atlas"/>
  </AdaptationSet>
...
```

Since the AdaptationSet has a plurality of representations and each representation has a different target bitrate as described above, the AdaptationSet may resultantly provide a group of the plurality of representations that provides a selection adaptively receivable for the component, such as the AdaptationSet.

According to the disclosure, in order for the terminal to receive 3D media, the representations provided in the AdaptationSet are required to be used in combination with the features of 3D media when providing different target bitrates.

In other words, since some components influence the number of points, some components influence image quality, and others influence the quality of the entire object, it is required to properly predict the range of influence by each, the number of 3D constituent units resultantly obtained, and the image quality.

In VPCC technology, while 3D media is converted into 2D media, an optimal portion in the form of a fragment is projected to each surface of a virtual cube surrounding the 3D media depending on the 3D constituent units (points, lines, or surfaces) of the 3D media in the virtual cube.

In this case, the color information for the projected 3D constituent unit is the attribute, the distance between the 3D constituent unit and the surface of the cube is the geometry, the division between the area having information for the projection among the surfaces of the cube and the area having no such information is the occupancy map, and metadata necessary to reconstruct 3D media back into 3D and constitute it on a space is the atlas data.

For example, since the quality of the content component transmitting the geometry reduces, the information for the distance from the surface of the cube to the 3D constituent unit becomes more uncertain, the 3D constituent units reconstructed may increase due to errors or, if overlapping, they may decrease. Further, since the distance accuracy between the original and the reconstructed result decreases, evaluation criteria, such as the distance between the original point and the reconstructed point, and the orthogonal distance between the plane including the original point and the reconstructed point, will be scored low.

For example, as the quality of the content component transmitting the attribute reduces, the information for the color assigned to the reconstructed 3D constituent unit loses details. Further, since the color accuracy between the original and the reconstructed result is lowered, such an evaluation criteria as, e.g., color difference in the YUV color system between the original point and the reconstructed point will be scored low.

For example, as the quality of the content component transmitting the occupancy map decreases, it becomes unclear what portion is information to be reconstructed and what portion is not supposed to be reconstructed in the video image of the geometry and attribute. Thus, the 3D constituent unit supposed to be reconstructed may not be, or vice versa, so that 3D media overall containing lots of noise may be reconstructed.

Given such characteristics, in the case of VPCC, it may be identified that factors influencing the quality of 3D media differ for each content component, and so do their degrees of influence. More generally, for content having some multiple types of content components as components, it is suggested to score and list the content components, with their influence given priority. More specifically, it is proposed to specify the performance element of each content component and describe resultant scores.

According to an embodiment of the disclosure, the occupancy map content component constituting VPCC content influences whether the reconstructed 3D media has information read from the geometry and attribute content components depending on its quality. Thus, it is hard to avoid noise due to low-quality occupancy map however high-quality geometry and attribute are received.

Further, even after a high-quality occupancy map content component is received, if a low-quality geometry is received, the positions of the points may overall change, so that the shape of the reconstructed 3D media may be changed. As described above, since the SACC is provided to allow different qualities of content components according to usage examples of the application, the priority of the content components may be differently evaluated in terms of application.

Thus, there is disclosed a method for providing a quality priority (@qualityPriority) of the included content component (Table 8) at the level of content or providing its own quality priority at the level of content component (Table 9).

Table 8 shows an example of a subset providing quality priority at the level of content, and Table 9 shows an example of a subset providing quality priority at the level of content component.

TABLE 8

```
<MPD>
  ...
  <Subset id="1" contains="1 2 3 4 5" qualityPriority="5 4 3 2 1"
contentType="VPCC/MP4" compositionType="SACC" />
    <AdaptationSet Id="1" />
    <AdaptationSet Id="2" />
    <AdaptationSet Id="3" />
  ...
```

TABLE 9

```
<MPD>
  ...
  <Subset id="1" contains="1 2 3 4 5" contentType="VPCC/MP4" compositionType="SACC">
    <Role schemeIdUrl="urn:mpeg:vpcc:2020" value="sacc"/>
  <Subset>
  <AdaptationSet Id="1" qualityPriority="2">
    <Role schemeIdUrl="urn:mpeg:vpcc:2020" value="geometry numLayer=2 layer0"/>
  </AdaptationSet>
  <AdaptationSet Id="2" qualityPriority="2"></AdaptationSet>
    <Role schemeIdUrl="urn:mpeg:vpcc:2020" value="geometry numLayer=2 layer1"/>
  <AdaptationSet Id="3" qualityPriority="3">
    <Role schemeIdUrl="urn:mpeg:vpcc:2020" value="attribute numLayer=1"/>
  </AdaptationSet>
  <AdaptationSet Id="4" qualityPriority="1">
    <Role schemeIdUrl="urn:mpeg:vpcc:2020" value="occupancy numLayer=1"/>
  </AdaptationSet>
  <AdaptationSet Id="5" qualityPriority="1">
    <Role schemeIdUrl="urn:mpeg:vpcc:2020" value="atlas"/>
  <AdaptationSet>
  ...
```

In particular, when the same priority value is specified for content components, it may be appreciated that they have the same rate of priority. Since the content component including layer 0 of the geometry and the content component including layer 1 of the geometry are AdaptationSet number 1 and AdaptationSet number 2, respectively, in Table 9, the same value may be assigned to the same type of content components.

According to the disclosure, it is proposed to specify factors influencing the quality of the 3D media to be reconstructed per adaptive selection, i.e., at the level of representation and to describe the score resultant therefrom.

In describing the following factors at the level of representation, since all cases of combinations of various content components are not included, only degrees or levels, i.e., steps 1 to 5 or best/good/normal/poor/worst, or high/middle/low, of influences that are widely had may be described.

Table 10 shows quality factors for each content component type, and Table 11 shows an example of application of quality factors at the level of representation.

TABLE 10

Geometry:
- NumberOfPoints
- ScoreD1psnr
- ScoreD2psnr
Attribute:
- ScoreYpsnr
- ScoreUpsnr
- ScoreVpsnr
OccupancyMap:
- Noise
- missedPoints

TABLE 11

```
<MPD>
...
  <Subset id="1" contains="1 2 3 4 5" contentType="VPCC/MP4" compositionType="SACC">
    <Role schemeIdUrl=urn:mpeg:vpcc:2020 value="sacc"/>
  </Subset>
  <AdaptationSet Id="1" qualityPriority="2">
    <Role schemeIdUrl="urn:mpeg:vpcc:2020" value="geometry numLayer=2 layer0"/>
    <Representation Id="1" bitrate="255355" NumberOfPoints="high" ScoreD1psnr="best" ScoreD2psnr="best"/>
    <Representation Id="2" bitrate="128177" NumberOfPoints="middle" ScoreD1psnr="good" ScoreD2psnr="good"/>
    <Representation Id="3" bitrate="64090" NumberOfPoints="low" ScoreD1psnr="bad" ScoreD2psnr="bad"/>
  </AdaptationSet>
...
```

According to another embodiment of the disclosure, it may be represented how much the representation has changed relative to the original. The 2D video generated while converting 3D media into 2D media is one obtained by removing one axis via projection from the XYZ coordinate system of the 3D media and moving it to a 2D plane, e.g., XY or YZ plane, in a one-to-one correspondence manner.

Thus, there exists resolution information determined to flawlessly convert the 3D media into the 2D media. The disclosure defines this resolution as a nominal resolution, provides a changed resolution per individual representation, and provides information for allowing a 3D player to activate a scaler for changing the received content component, determine what rate it is to be scaled up or down, and estimate the degree of influence by errors predicted thereby.

Per-representation resolutions are disclosed in the prior art. The disclosure features providing the nominal resolution, determining the degree of influence on quality thereby, and providing the nominal resolution at the level of content component.

Table 12 shows an example of the nominal resolution at the content component level.

TABLE 12

```
<MPD>
...
  <Subset id="1" contains"1 2 3 4 5" contentType="VPCC/MP4" compositionType="SACC">
    <Role schemeIdUrl="urn:mpeg:vpcc:2020" value="sacc"/>
  </Subset>
  <AdaptationSet Id="1" nominalWidth="1920" nominalHeight="1080">
    <Role schemeIdUrl="urn:mpeg:vpcc:2020" value="geometry numLayer=2 layer0"/>
    <Representation Id="1" bitrate="255355" width="1900" height="1000"/>
    <Representation Id="2" bitrate="128177" width="1400" height="700"/>
    <Representation Id="3" bitrate="64090" width="000" height="400"/>
  </AdaptationSet>
...
```

Another Embodiment of the Disclosure: RTSP

The real time streaming protocol (RTSP) is a protocol designed for the purpose of controlling a media streaming server and was standardized by the IETF (RFC 7826) and was adopted as a media streaming protocol by the 3GPP.

According to the related art, when performing media streaming between server and client using the RTSP, manifest information for media streaming (e.g., media component information indicating whether media is an audio or video and encoding information for media) is determined by pre-negotiation between server and client using a session description protocol (SDP) format.

Described below is a method for explicitly specifying an identifier for media type in units of contents and content components in the manifest provided according to the disclosure when the RTSP is used rather than the above-described DASH.

Table 13 shows an example representation of 2D media manifest information using a SDP format according to the related art.

TABLE 13

```
DESCRIBE rtsp://mediaserver.com/test RTSP/2.0
<Generic Session Information>
...
<Media Information>
m=video 0 RTP/AVP 97
a=rtpmap:97 H264/90000
m=video 0 RTP/AVP 98
a=rtpmap:98 H265/9000
...
```

In the above example, the DESCRIBE line is a command for the server to indicate, to the client, the attributes of streaming media, and the overall session information (e.g., version and overall rate) is transferred in <Generic Session Information> that follows. The attributes for individual media components are represented in <Media Information> subsequent thereto. The line starting with " " indicates the media component (video/audio) and the protocol transmitted, and the subsequent line transfers individual attributes (e.g., encoder and per-media rates) for the media.

Table 14 shows an example of an SDP message for indicating 3D media configuration information according to an embodiment.

TABLE 14

```
DESCRIBE rtsp://mediaserver.com/test RTSP/2.0
<Generic Session Information>
...
a=3d-group:v-pcc 101 102 103
<Media Information>
m=application 500 TCP/WSS/S 99 100      /* Occupancy component */
a=uri:99 rtsp://mediaserver.com/resources1
a=uri:100 rtsp://mediaserver.com/resorces2
a=mid:101
m=video 0 RTP/AVP 97 98                 /* Geometry component */
a=rtpmap:97 H264/90000
a=rtpmap:98 H265/90000
a=mid:102
m=video 0 RTP/AVP 91 92                 /* Attribute component */
a=rtpmap:91 H264/9000
a=rtpmap:92 H265/9000
a=mid:103
```

In the example shown in Table 14, it is assumed that 3D content consists of three content components (three m-lines) which are individually an occupancy, a geometry, and an attribute.

The components (occupancy, geometry, and attributes) are assigned media IDs 101, 102, and 103, respectively, (a=mid: 10×), an attribute for grouping them is added to the session information (a=3d-group:v-pcc 101 102 103) to indicate that the three components need to be combined to constitute one 3D content.

Further, in the above example, a plurality of payload types (hereinafter, "PT") are signified in the m-lines to represent a plurality of representations (e.g., the same components with different bit rates). In other words, for the geometry component, two representations having PT number 97 and PT number 98 are signified to represent that number 97 has been encoded with H.264 and number 98 with H.265.

2D content representations of the related art signify the priority of media components as order of m-lines according to the SDP syntax, and this may be likewise applied to representing the quality priority of 3D content components. For instance, in the above example, it may be said that according to the order of m-lines written, the occupancy has the highest priority, and the attribute has the lowest priority.

In such a case, however, while the term "priority" in the schemes of the related art refers to an order in which one is selected from among a plurality of m-lines when the same component has the plurality of m-lines (the same component is constituted of a plurality of representations) (i.e., only one m-line is finally selected), the term "priority" according to the disclosure refers to an influence on the entire quality by different components (represented with a plurality of m-lines).

Providing Quality of Experience (QOE) Table for Each Component Combination

According to the disclosure, there is provided a method for receiving content representing 3D media and a combination of content components constituting the content according to the usage of an application. In this case, the content components affect one another so that the quality of the final 3D media which is played, with the received content components combined together, is influenced. Thus, there may be provided a function for providing the priority of the content components and reflecting it to the reception policy of the terminal.

However, since the priority simply represents that the degree of influence on quality relatively differs, but is not information for the quality of 3D media, the terminal is unable to know the resultant quality according to reception of different qualities for the content components before receiving them.

Thus, according to the disclosure, there is proposed a method for providing quality evaluation information for each quality criterion of the final 3D media obtained according to combination of content components at the content level of manifest, determining quality requirements for each content component to be received based on the information by the 3D player and 3D application of the terminal, determining a combination ensuring the minimum quality for critical quality evaluation items for the quality of the 3D media, and determining to receive it.

Table 15 shows an example of a quality of experience matrix configured in a subset.

TABLE 15

```
<MPD>
  <Subset id="1" contains="1 2 3 4 5" contentType="VPCC/MP4" compositionType="S
ACC">
    <QoeMatrix schemeIdUrl="VPCC" criteria="NumberOfPoints" value="100%" compos
itions="1:1 2:1 3:1 4:1 5:1" />
    <QoeMatrix schemeIdUrl="VPCC" criteria="NumberOfPoints" value="80%" compos
tions="1:2 2:2 3:4 4:1 5:1" />
  </Subset>
  ...
  <AdaptationSet Id="1">
    <Role schemeIdUrl="urn:mpeg:vpcc:2020" value="geometry numLayer=2 layer0"/>
    <Representation Id="1" bitrate="255355" />
    <Representation Id="2" bitrate="128177" />
    <Representation Id="3" bitrate="64090" />
  </AdaptationSet>
  <AdaptationSet Id="2"></AdaptationSet>
    <Role schemeIdUrl="urn:mpeg:vpcc:2020" value="geometry numLayer=2 layer1"/>
    <Representation Id="1" bitrate="255355" />
    <Representation Id="2" bitrate="128177" />
    <Representation Id="3" bitrate="64090" />
  <AdaptationSet Id="3">
    <Role schemeIdUrl="urn:mpeg:vpcc:2020" value="attribute numLayer=1"/>
    <Representation Id="1" bitrate="255355" />
    <Representation Id="2" bitrate="128177" />
    <Representation Id="3" bitrate="64090" />
  </AdaptationSet>
  <AdaptationSet Id="4">
```

TABLE 15-continued

```
  <Role schemeIdUrl="urn:mpeg:vpcc:2020" value="occupancy numLayer=1"/>
  <Representation Id="1" bitrate="255355" />
  <Representation Id="2" bitrate="128177" />
  <Representation Id="3" bitrate="64090" />
</AdaptationSet Id>
<AdaptationSet Id="5">
  <Role schemeIdUrl="urn:mpeg:vpcc:2020" value="atlas"/>
  <Representation Id="1" bitrate="255355" />
  <Representation Id="2" bitrate="128177" />
  <Representation Id="3" bitrate="64090" />
</AdaptationSet>
. . .
```

According to the disclosure, component information for content components that determines the final quality of 3D media is provided at the content level (in subset), as shown in Table 15. In the example, the subset specifies the ID of the AdaptationSet including the content component and provides a QoeMatrix list.

The QoeMatrix list specifies what scheme is followed for attributes described below, using the schemeUrl and describes one or more criteria, as quality criteria describable using the schemeIdURL.

Examples of the criteria are the same as those shown in Table 10 above (quality factors for each content component type). The quality achieved for the criteria may be represented in percentage relative to the highest quality. 100% means that it is equal to the highest quality, and 50% means, e.g., that only 0.5 million points may be reconstructed if one million points may be reconstructed at the highest quality.

The compositions is a list of combinations of adaptation identifiers and representation identifiers and is the minimum requirement to meet the quality, meaning that it may be met if a higher quality of representation than the requirement is received. In this case, whether the representation is of high quality or not is preferably determined by referring to attributes, which have a significant causal relationship in which the higher number is associated with the higher quality, such as bitrate, width, or height, among the attributes of the related art of representation.

In Table 15, the compositions specifies that reception at 1:2, 2:2, 3:4, 4:1, 5:1 or more is required to achieve a number of points criterion of 80%, meaning that representation #2 or more of quality needs to be received for AdaptationSets #1 and #2, i.e., two components of geometry, #4 or more of quality needs to be received for AdaptationSet #3, i.e., the attribute component, only #1 needs to be received for AdaptationSet #4, i.e., the occupancy component, and only #1 needs to be received for AdaptationSet #5, i.e., the atlas component.

By providing minimum representation combination information meeting the minimum quality requirement as described above, the QoeMatrix list may be represented as a necessary number of steps for a necessary quality criterion and this is useful when the terminal and application determine content components to receive depending on network context, as more effective than providing all possible combinations.

For the service provider and content provider to more actively manage the quality of the terminal, a forcedQoePlay attribute may be provided as an additional attribute of the subset or preselection and, if the attribute is provided and its value is 1, it is possible to force the terminal to receive only combinations present in the queMatrix.

Table 16 shows an example of the forcing method.

TABLE 16

```
<MPD>
   <Subset id="1" contains="1 2 3 4 5" contentType="VPCC/MP4" compositionType="S
ACC" forcedQoePlay="1">
      <QoeMatrix schemeIdUrl="VPCC" criteria="NumberOfPoints" value="100%" compos
itions="1:1 2:1 3:1 4:1 5:1" />
      <QoeMatrix schemeIdUrl="VPCC" criteria="NumberOfPoints" value="80%" composi
tions="1:2 2:2 3:4 4:1 5:1" />
      . . .
   </Subset>
   . . .
```

Figure 4:
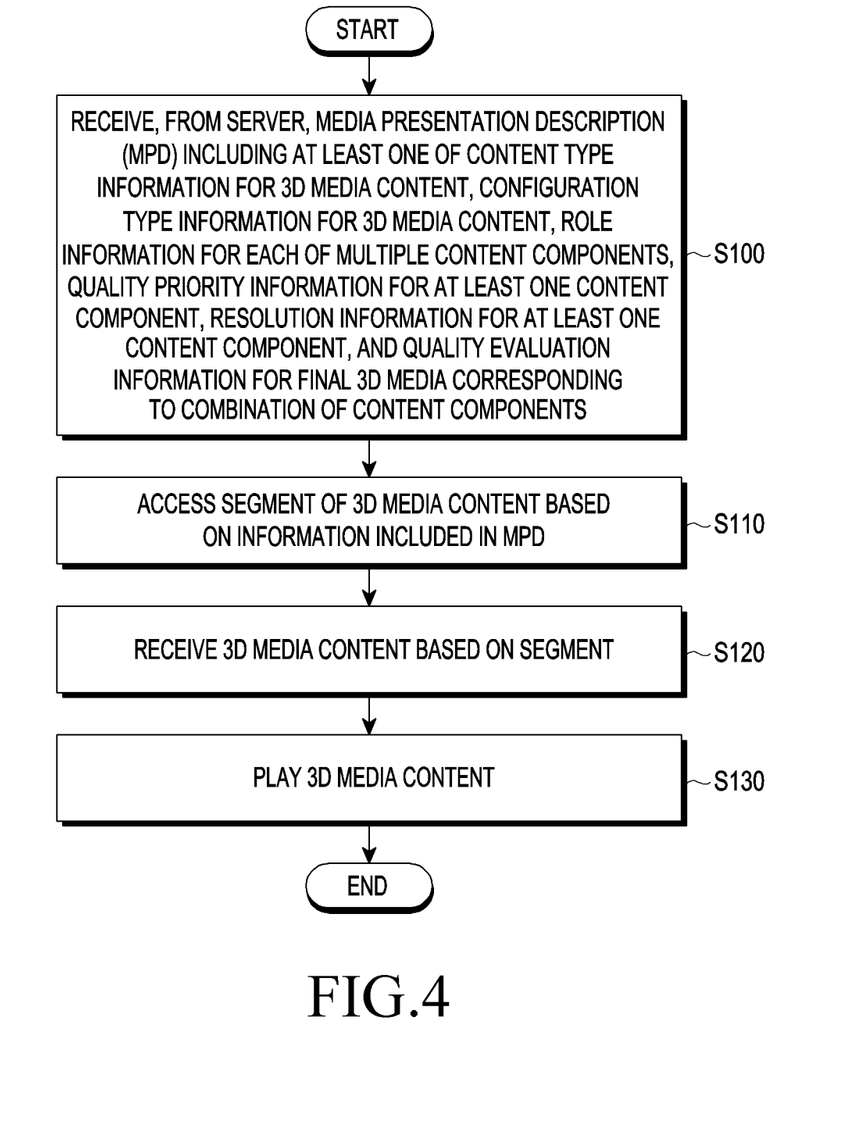
FIG. 4 is a flowchart illustrating a method for playing media content by a client terminal according to an embodiment of the disclosure.

FIG. 4 is a flowchart illustrating a method for playing media content by a client terminal according to an embodiment of the disclosure.

The client terminal described in connection with FIG. 4 refers to the client terminal shown in FIGS. 1 and 3, and the client terminal may perform various embodiments described above.

Referring to FIG. 4, in operation S100, the client terminal may receive, from a server, a media presentation description (MPD) including at least one of content type information for 3D media content, configuration type information for the 3D media content, role information for each of a plurality of content components, quality priority information for at least one content component, resolution information for at least one content component, and quality evaluation information for final 3D media corresponding to a combination of the content components.

The server may mean the service provider or content provider shown in FIGS. 1 and 2, and the server may perform various embodiments described above.

In operation S110, the client terminal may access a segment of the 3D media content based on information included in the MPD.

In operation S120, the client terminal may receive the 3D media content based on the segment.

In operation S130, the client terminal may play the 3D media content using a 3D media player implemented therein.

Figure 5:
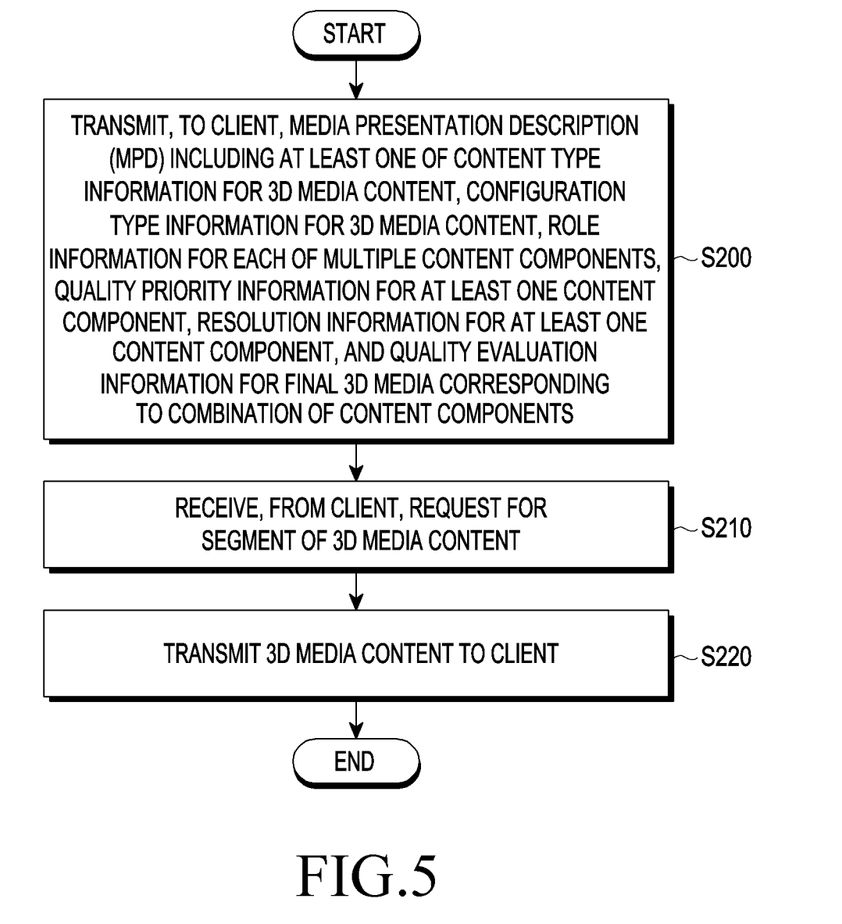
FIG. 5 is a flowchart illustrating a method for providing media content by a server according to an embodiment of the disclosure.

FIG. 5 is a flowchart illustrating a method for providing media content by a server according to an embodiment of the disclosure.

The server may mean the service provider or content provider shown in FIGS. 1 and 2, and the server may perform various embodiments described above.

Referring to FIG. 5, in operation S200, the server may transmit, to a client, a media presentation description (MPD) including at least one of content type information for 3D media content, configuration type information for the 3D media content, role information for each of a plurality of content components, quality priority information for at least one content component, resolution information for at least one content component, and quality evaluation information for final 3D media corresponding to a combination of the content components.

In operation S210, the server may receive a request for a segment of the 3D media content from the client.

In operation S220, the server may transmit the 3D media content to the client.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, ROMs, electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments of the disclosure, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

As is apparent from the foregoing description, according to embodiments of the disclosure, it is possible to efficiently transmit and receive 3D media having different attributes and structures from 2D media in a communication system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for receiving media content by a client, the method comprising:

receiving, from a server, a media presentation description (MPD) including content type information indicating an identifier for three-dimensional (3D) media content, configuration type information indicating that a type of the 3D media content is a separately adaptable content component (SACC), and quality priority information for multiple content components in the 3D media content;

accessing a segment of the 3D media content based on the content type information, the configuration type information, and the quality priority information in the MPD; and receiving the 3D media content based on the segment, wherein:

based on the configuration type information indicating the SACC, a first content component in the 3D media content has a different target bitrate with a second content component in the 3D media content, and based on the configuration type information indicating the SACC, the client adjusts reception quality per content component in the 3D media content depending on application.

2. The method of claim 1, wherein the content type information is included, as an attribute, in a subset element or a preselection element which is a media content unit included in the MPD, and wherein the configuration type information is included, as an attribute, in the subset element or the preselection element which is the media content unit included in the MPD.

3. The method of claim 1, wherein the quality priority information is included, as an attribute, in a subset element or a preselection element which is a media content unit included in the MPD or the quality priority information is included, as an attribute, in an AdaptationSet element which is a content component unit included in the MPD.

4. The method of claim 1, wherein the MPD further includes resolution information for at least one content component, wherein the resolution information includes information necessary to convert the 3D media content into two-dimensional (2D) media, and wherein the resolution information is included, as an attribute, in an AdaptationSet element which is a content component unit included in the MPD.

5. The method of claim 1, wherein the MPD further includes quality evaluation information for final 3D media corresponding to a combination of content components, and wherein the quality evaluation information is included, as an attribute, in a subset element or a preselection element which is a media content unit included in the MPD.

6. A method for providing media content by a server, the method comprising:

transmitting, to a client, a media presentation description (MPD) including content type information indicating an identifier for three-dimensional (3D) media content, configuration type information indicating that a type of the 3D media content is a separately adaptable content component (SACC), and quality priority information for multiple content components in the 3D media content;

receiving, from the client, a request for a segment of the 3D media content; and transmitting, to the client, the 3D media content, wherein:

based on the configuration type information indicating the SACC, a first content component in the 3D media content has a different target bitrate with a second content component in the 3D media content, and based on the configuration type information indicating the SACC, the client adjusts reception quality per content component in the 3D media content depending on application.

7. The method of claim 6,
wherein the content type information is included, as an attribute, in a subset element or a preselection element which is a media content unit included in the MPD, and
wherein the configuration type information is included, as an attribute, in the subset element or the preselection element which is the media content unit included in the MPD.

8. The method of claim 6,
wherein the quality priority information is included, as an attribute, in a subset element or a preselection element which is a media content unit included in the MPD or the quality priority information is included, as an attribute, in an AdaptationSet element which is a content component unit included in the MPD.

9. The method of claim 6,
wherein the MPD further includes resolution information for at least one content component,
wherein the resolution information includes information necessary to convert the 3D media content into two-dimensional (2D) media, and
wherein the resolution information is included, as an attribute, in an AdaptationSet element which is a content component unit included in the MPD.

10. The method of claim 6,
wherein the MPD further includes quality evaluation information for final 3D media corresponding to a combination of content components, and
wherein the quality evaluation information is included, as an attribute, in a subset element or a preselection element that is a media content unit included in the MPD.

11. A client terminal configured to receive media content, the client terminal comprising:
a transceiver; and
at least one processor coupled with the transceiver and configured to control to:
receive, from a server, a media presentation description (MPD) including content type information indicating an identifier for three-dimensional (3D) media content, configuration type information indicating that a type of the 3D media content is a separately adaptable content component (SACC), and quality priority information for multiple content components in the 3D media content,
access a segment of the 3D media content based on the content type information, the configuration type information, and the quality priority information in the MPD, and
receive the 3D media content based on the segment, wherein:
based on the configuration type information indicating the SACC, a first content component in the 3D media content has a different target bitrate with a second content component in the 3D media content, and
based on the configuration type information indicating the SACC, the client terminal adjusts reception quality per content component in the 3D media content depending on application.

12. The client terminal of claim 11,
wherein the content type information is included, as an attribute, in a subset element or a preselection element which is a media content unit included in the MPD, and
wherein the configuration type information is included, as an attribute, in the subset element or the preselection element which is the media content unit included in the MPD.

13. The client terminal of claim 11,
wherein the quality priority information is included, as an attribute, in a subset element or a preselection element which is a media content unit included in the MPD or the quality priority information is included, as an attribute, in an AdaptationSet element which is a content component unit included in the MPD.

14. A server configured to provide media content, the server comprising:
a transceiver; and
at least one processor coupled with the transceiver and configured to control to:
transmit, to a client, a media presentation description (MPD) including content type information indicating an identifier for three-dimensional (3D) media content, configuration type information indicating that a type of the 3D media content is a separately adaptable content component (SACC), and quality priority information for multiple content components in the 3D media content,
receive, from the client, a request for a segment of the 3D media content, and
transmit, to the client, the 3D media content,
wherein:
based on the configuration type information indicating the SACC, a first content component in the 3D media content has a different target bitrate with a second content component in the 3D media content, and
based on the configuration type information indicating the SACC, the client adjusts reception quality per content component in the 3D media content depending on application.

15. The server of claim 14,
wherein the content type information is included, as an attribute, in a subset element or a preselection element which is a media content unit included in the MPD, and
wherein the configuration type information is included, as an attribute, in the subset element or the preselection element which is the media content unit included in the MPD.

16. The server of claim 14,
wherein the MPD further includes resolution information for at least one content component,
wherein the resolution information includes information necessary to convert the 3D media content into two-dimensional (2D) media, and
wherein the resolution information is included, as an attribute, in an AdaptationSet element which is a content component unit included in the MPD.

* * * * *